United States Patent [19]

Case et al.

[11] Patent Number: 4,753,458
[45] Date of Patent: Jun. 28, 1988

[54] QUICK CONNECTOR ASSEMBLY

[75] Inventors: Carl L. Case; Richard A. West, both of Canton, Ohio

[73] Assignee: Harvard Industries, Inc., St. Louis, Mo.

[21] Appl. No.: 97,333

[22] Filed: Sep. 11, 1987

Related U.S. Application Data

[63] Continuation of Ser. No. 901,014, Aug. 28, 1986, abandoned, which is a continuation of Ser. No. 757,787, Jul. 22, 1985, abandoned.

[51] Int. Cl.$^4$ ............................................. F16L 37/00
[52] U.S. Cl. ..................... 285/93; 285/319; 285/379; 285/921; 285/360
[58] Field of Search ............... 285/24, 93, 108, 319, 285/320, 321, 379, 921

[56] References Cited

U.S. PATENT DOCUMENTS

| | | | |
|---|---|---|---|
| 2,982,586 | 5/1961 | Gliebe | 285/DIG. 22 |
| 3,368,830 | 2/1968 | French | 285/24 |
| 3,439,943 | 4/1969 | Thorne-Thomsen | 285/321 |
| 3,711,125 | 1/1973 | Dehar | 285/319 |
| 3,826,523 | 7/1974 | Eschbaugh | 285/DIG. 22 |
| 3,847,421 | 11/1974 | Eschbaugh et al. | 285/379 |
| 3,997,196 | 12/1976 | Karcher et al. | 285/319 |
| 3,999,783 | 12/1976 | Legris | 285/24 |
| 4,135,745 | 1/1979 | Dehar | 284/DIG. 22 |
| 4,310,185 | 1/1982 | Bartholomew | 285/DIG. 22 |
| 4,401,326 | 8/1983 | Blair | 285/93 |
| 4,423,892 | 1/1984 | Bartholomew | 285/319 |
| 4,433,815 | 2/1984 | D'Agnolo | 285/DIG. 22 |
| 4,462,622 | 7/1984 | Barzuza | 285/DIG. 22 |
| 4,538,836 | 9/1985 | Krütten | 285/24 |
| 4,541,658 | 9/1985 | Bartholomew | 285/DIG. 22 |

*Primary Examiner*—Randolph A. Reese
*Assistant Examiner*—Anthony Knight
*Attorney, Agent, or Firm*—Oblon, Fisher, Spivak, McClelland & Maier

[57] ABSTRACT

A quick connector assembly for interconnecting of two conduits in fluid flow relationship is provided. The connector assembly has an elongated tubular housing connected to one conduit and adapted to receive a terminal end portion of another conduit in axially inserted relationship. A retainer cap rotatably attachable to an end of the housing includes a plurality of spring fingers that project axially inwardly of the housing and that engage with an annular ring formed on the axially inserted conduit to mechanically engage therewith and lock together the housing and conduit with a fluid seal provided between the housing and conduit. A visual and tactile indicating mechanism is included to provide a perceivable indication that the housing and conduit are mechanically interlocked. This indicating mechanism includes a spring biased indicator tab which is displaced radially outwardly through an aperture in the wall of the housing where it may be perceived, visually or tactilely, by the annular ring on the conduit when it is inserted into locked engagement. The retainer cap locks onto the housing by locking tabs carried on the housing and projectable through apertures in the cap to provide an indication of locked engagement.

48 Claims, 4 Drawing Sheets

QUICK CONNECTOR ASSEMBLY

This application is a continuation of application Ser. No. 901,014, filed on Aug. 28, 1986, now abandoned, which is a continuation of Ser. No. 757,287 filed July 22, 1985, now abandoned.

FIELD OF THE INVENTION

This invention relates in general to a connector assembly for use in interconnecting of fluid conduits. It relates more specifically to a connector assembly that is of a quick connecting type as well as providing for swiveling between the two connected conduits and for disassembly.

BACKGROUND OF THE INVENTION

While the automotive vehicle installations of fluid conduits is an example of where connector assemblies of the type provided by this invention may be advantageously utilized and provides representative illustrations of problems solved by the connector assembly, it will be understood that reference to this background is not deemed limitative as to use in application of the invention. Automotive vehicles utilize many different fluid conduits with the primary conduit being those for fuel, water and refrigerants. Production of automobiles requires assembly of the various fluid conduits to either other conduits or to apparatus components. Interconnection of the components and conduits is substantially a manual operation and an operation which is not particularly susceptible to mechanization. Consequently, there is a significant cost factor represented by the manual labor that is involved.

The connector assemblies that have been heretofore employed as an essentially uniform practice by automotive manufacturers comprise threaded fittings and conduits that must be threaded together and invariably require the use of wrenches to assure a fluid tight seal. To reduce the labor costs involved in the otherwise time consuming operation of manually assembling the threaded couplings, attempts have been made to devise quick connect type connector assemblies through an axial insertion of the one component into another with the two elements then being retained together by either a detent mechanism or by a resilient interconnecting mechanism.

While labor costs are a significant factor in assembly of the conduit connectors, the component costs and effectivity in forming a fluid tight seal are other factors of substantial importance. Quick connectors of relatively costly construction such as the detent mechanism type have been available. While quick connectors of this type are capable of providing an effective fluid tight seal, the cost of such devices has been prohibitive when compared with labor costs and the cost of the threaded type connectors. Accordingly, the efforts in devising suitable quick connector assemblies for use in the automotive industry have been directed to utilization of plastic materials with the components being configured to permit economical molding and avoidance of costly machining operations that are customarily associated with detent-type connectors fabricated from metal heretofore employed.

SUMMARY OF THE INVENTION

In accordance with this invention, a quick connector assembly is provided for interconnection of fluid conduits and incorporates an advantageous construction and configuration of components which not only enables the easy and quick interconnection of those components, but which also provides a positive indication that the components are fully and properly assembled to assure a fluid tight seal. The illustrative embodiment of the connector assembly includes a connector fitting into which a fluid conduit may be axially inserted. Insertion of the fluid conduit into interlocked relationship results in actuation of components that provide a positive indication of complete assembly. The connector fitting comprises an elongated tubular housing which is open at one end and adapted to be provided with a retainer cap that is preassembled with the housing and that permits axial insertion of a terminal end portion of another conduit through the cap. Upon complete insertion of the other conduit, the tubular housing mechanically interlocks with the inserted conduit and retains the tube components in securely coupled relationship. A pair of spring biased indicator tabs are actuated in response to the locking engagement of the components to position those indicating tabs so that they may be visually observed as well as enabling one to determine proper interconnection by tactile inspection.

Positive assembly of the retainer cap with the elongated tubular housing of the connector fitting is also provided by visual and tactile indicating means. Also, the retainer cap and tubular housing embody a construction that enables disassembly to permit disconnection of the fluid conduits for purposes of repair and maintenance of the fluid system. Furthermore, in accordance with this invention, the retainer cap and tubular housing are constructed to employ a configuration of mechanically interengaging components that are designed to be manipulated with a relative rotatable operation similar to the threaded type fittings with which maintenance personnel are familiar with the consequent advantage of facilitating maintenance servicing subsequent to the manufacturing operation.

The connector assembly embodies a configuration enabling the interconnected conduits to swivel about their respective longitudinal axes. Permitting swiveling thus avoids a requirement for specific orientation of the components in assembly. The structure includes fluid sealing means which assures an effective fluid seal and essentially eliminates the likelihood of fluid leaks. The sealing means includes a cylindrical seal element formed from an elastomeric material which is inserted into an interior chamber of the tubular housing and is secured in fixed position therein by a seal retainer. In accordance with this invention, the seal retainer is of a configuration to cooperatively mechanically interengage with the tubular housing by means of a snap-type interlocking action. This construction enables the components of the sealing means to be quickly and easily assembled into the housing by means of simple mechanical assembly operations that can be readily and quickly accomplished without utilization of any tools.

These and other objects and advantages of this invention will be readily apparent from the following detailed description of an illustrative embodiment thereof and the accompanying drawings.

DESCRIPTION OF THE DRAWING FIGURES

DESCRIPTION OF THE ILLUSTRATIVE EMBODIMENT

Figure 1:
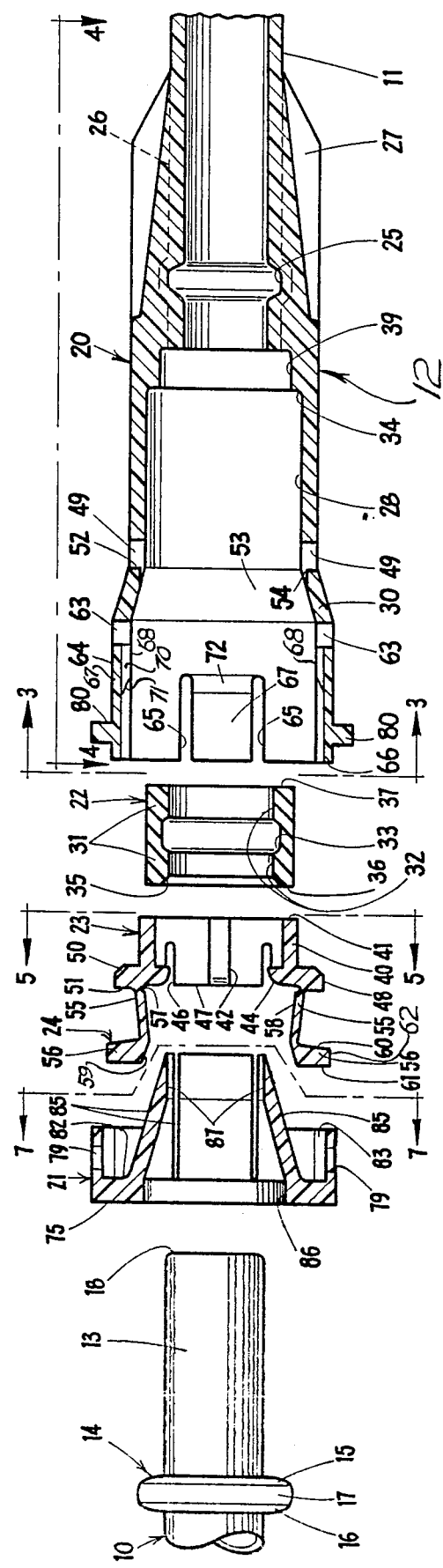
FIG. 1 is a medial longitudinal sectional view of a connector assembly embodying this invention with the several components thereof separated for clarity of illustration.
Figure 2:
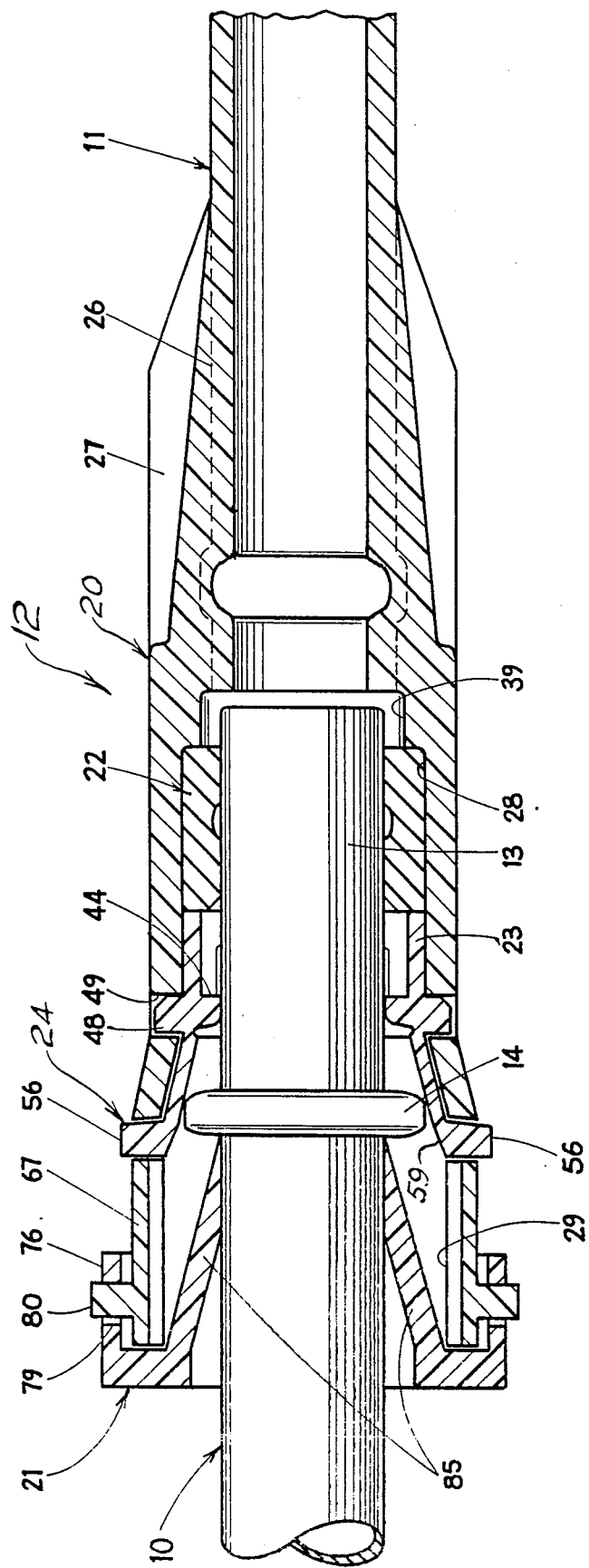
FIG. 2 is a medial longitudinal sectional view of the connector assembly on a slightly enlarged scale with the components thereof disposed in assembled relationship.

Referring to FIGS. 1 and 2, the illustrative embodiment of the quick connector assembly of this invention is shown as adapted for interconnection of a first fluid conduit 10 with a second fluid conduit 11. Each of these conduits is illustrated as being part of an otherwise undisclosed elongated conduit that is adapted to be connected at some remote point to either another conduit or to some apparatus or component which is either the source or a utilization device for the fluid to be conveyed. However, this utilization of the invention is not to be considered limitative on the scope of the invention, as it is also contemplated that one of the conduits, or both for that matter, may be formed as integral elements of other apparatus or devices. For further illustrating utilization of the invention, the first fluid conduit 10 may be a metal fitting which can be secured directly into a device such as a carburetor as by means of a threaded interconnection (not shown). The first fluid conduit 10 may also be of a rigid self-supporting construction and will then also provide mechanical support for the other components of the assembly. The second fluid conduit 11 in this illustrative arrangement may comprise a flexible tube. This construction facilitates placement within the engine compartment, as the second fluid conduit 11 may be readily routed around other structural members of an automotive vehicle as in the case of a fuel line leading to the fuel tank, none of which ancillary elements is illustrated in the drawings.

Comprising the connector assembly are two major components with the one component being generally identified as the first fluid conduit 10 and the second component being generally identified as a connector fitting 12. The first fluid conduit 10 includes a terminal end portion 13 and an annular ring 14. A metal or suitable plastic material may be utilized in the fabrication of the first fluid conduit 10 and the annular ring 14 may be conveniently formed as an integral part of the first fluid conduit 10 by suitable mechanical forming operations in the case of a metallic tube or by molding in the case of a plastic construction. The annular ring 14 projects a predetermined distance radially outwardly with respect to the exterior surface of the first fluid conduit 10 and is formed with relatively convergent wall surfaces 15 and 16 terminating in an outer cylindrical band 17 of relatively narrow dimension. It will be noted here that the annular ring 14 has a twofold function which, as will be described in further detail, includes cooperating in effecting a mechanical interlock of the components and effecting actuation on the indicating means to show that the mechanical interlock has been effected.

The terminal end portion 13 of the first fluid conduit 10 cooperatively interfits with an element to effect fluid sealing between the several components. Since the connector assembly is designed to be repeatedly assembled and disassembled and the sealing element is formed from a suitable elastomeric material, the outer surface of the terminal end portion 13 is fabricated to be smooth (and polished, if necessary) to avoid abrasive interaction with the sealing element to obtain a relatively longer life for the sealing element. The smooth surface additionally enhances the effectiveness of the seal. Additionally, the extreme end of the terminal end portion 13 is radiused at 18 to facilitate its insertion into the sealing element as will be described in further detail.

Included in the connector fitting 12 are the five components designated as an elongated tubular housing 20, a retainer cap 21, a fluid seal means 22, a seal retainer 23, and interlock indicating means 24. In this illustrative embodiment, the second fluid conduit 11 is interconnected with the tubular housing 20 in a manner to form an integral structure. Each of these components is advantageously formed from a commercially available material which is designated in the trade as Nylon 12. This material has the desirable characteristic of being resistant to chemical degradation from contact with gasolene type fuels. This synthetic resin material may be readily formed by extrusion and molding operations into desired configurations and structures paragraph instruction. The second fluid conduit 11 is relatively thin walled and is thus capable of exhibiting a desired degree of flexibility enabling its placement in an automotive vehicle for interconnection between various components as it may be readily conformed to fit closely adjacent to supporting surfaces and other structures. The tubular housing 20 is formed from substantially the same material, but modified to the extent that it will form a structure that is substantially rigid. A fabrication technique that has been found particularly advantageous is to first form the second fluid conduit 11 as a separate element and then to mold the tubular housing 20 onto a terminal end portion of the second fluid conduit 11. For this purpose, the second fluid conduit 11 is formed with an annular ring 25 disposed closely adjacent its terminal end. Molding of the tubular housing 20 around the terminal end of the second fluid conduit 11 then results in not only a chemical bonding between the two elements, but also obtaining the advantage of a mechanical interlock between the components. The materials themselves are compatible and, in the molding operation, the result is an integral construction as is indicated in the drawings, but there is effectively retained a mechanical type interconnection as a consequence of the annular ring 25. The demarcation between the tubular housing 20 and the second fluid conduit 11 is indicated by the broken line identified by the numeral 26. Further structural rigidity and greater strength at the junction of the second fluid conduit 11 with the tubular housing 20 is obtained through the formation of a plurality of longitudinally extending ribs 27. In this illustrative embodiment, there are four such ribs 27 with the contiguous portions of the tubular housing 20 being conically tapered, thus resulting in a minimization of the quantity of material required for construction, but obtaining the requisite structural strength.

Formed in the interior of the tubular housing 20 for receipt of the other components are two axially disposed cylindrical chambers 28 and 29 of different diameters. These two chambers 28 and 29 are interconnected by a frusto conical section 30 forming a transition between the relatively smaller diameter of the inner chamber 28 and the outer chamber 29.

The inner chamber 28 receives the seal means 22 and the seal retainer 23 and is of an appropriate length for those components. The fluid seal means 22 comprises a cylindrical shell formed from a suitable elastomeric material. This shell is formed with two inwardly projecting annular rings 31 having respective cylindrical surfaces 32 formed with a diameter to interfit with the exterior surface of the terminal end portion 13 of the first fluid conduit 10 and form an effective fluid seal therewith. Formed between the two annular rings 31 is an annular recess 33 having the function of providing a space into which excess material of the seal means may be forced as a consequence of the interference type fit that is required to effect the desired fluid seal. It will be noted that the cylindrical shell of the seal means 22 has an exterior diameter which is designed to result in contacting engagement with the interior wall surface of the inner chamber 28.

The interior end of the inner chamber 28 is formed with an inwardly projecting lip 34 at its innermost end providing a surface against which the seal means 22 is positioned to maintain it in a fixed position when the components are assembled. A beveled surface 35 is formed at one end of the seal means 22 as a continuation of the adjacent one of the cylindrical surfaces 32 to provide a guideway for facilitating insertion of the first fluid conduit 10 into the seal means 22.

As seen in FIG. 2, a small cylindrical chamber 36 is formed in the tubular housing 20 between the inner end of the inner chamber 28 and the end of the second fluid conduit 11. The cylindrical chamber 36 has a diameter slightly less than that of the inner chamber 28 for the seal means 22 and is of a relatively short axial length. The purpose of the small cylindrical chamber 36 is to provide a clearance space for receiving a marginal end portion of the first fluid conduit 10 as may be necessary to accommodate manufacturing tolerances.

Adapted to be positioned in the inner chamber 28 in mechanically interlocked relationship to the tubular housing 20 is the seal retainer 23. The seal retainer 23 comprises a cylindrical ring 40 of a diameter which will enable it to be positioned in the inner chamber 28. The cylindrical ring 40 has a end wall 41 adapted to contactingly engage the opposed surface of an end wall 39 formed on the fluid seal means 22.

Figure 5:
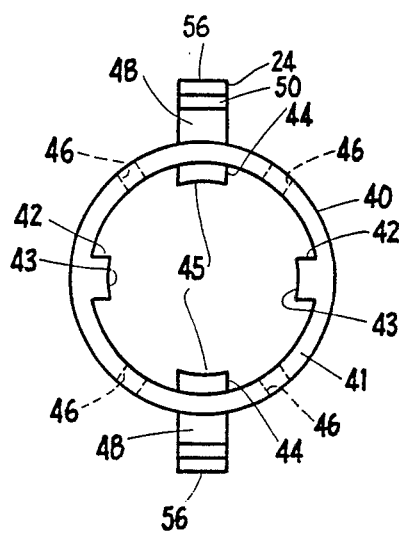
FIG. 5 is an end elevational view of the seal retainer as viewed on a plane designated by line 5—5 of FIG. 1.

Formed on the interior of the cylindrical ring 40 are several elements which project radially inwardly and are adapted to engage with the exterior surface of the terminal end portion 13 of the first fluid conduit 10 when it is inserted therethrough. These projections include two axially extending lands 42 disposed in diametrically opposed relationship, as can be best seen in FIG. 5, and extend the entire length of the cylindrical ring 40. Each of the lands 42 is formed with a concave, inwardly facing surface 43 which provides a guiding and support surface of the terminal end portion 13 of the first fluid conduit 10. Two other projections 44 are formed in the cylindrical ring 40 for the same purpose. Each of these projections is disposed intermediate the lands 42 and in diametrically opposed relationship to each other. Each of the two projections 44 is of relatively short axial length, but is also formed with inwardly facing surface 45 of concave configuration to cooperatively interfit with the exterior surface of the first fluid conduit 10.

Pairs of axially extending slots 46 are formed in the cylindrical ring 40 at opposite sides of each respective one of the projections 44. The slots 46 open at the end wall 47 opposite to the end wall 41 which contacts with the seal means 22. The function of the slots 46 is to weaken the cylindrical ring 40 to a sufficient extent in the region of the projections 44 to enable the intervening portion of the cylindrical ring 40 to flex inwardly. The entrance ends of the lands 42 and the projections 44 are advantageously radiused as is shown in FIG. 1 with respect to the projections 44. The seal container 23 is preferably formed from an appropriate synthetic resin material so that it will exhibit sufficient resilience to permit the inward flexing of that portion of the cylindrical ring 40 for purposes to be subsequently explained, but otherwise maintain the ring in its cylindrical configuration.

The retention of the seal retainer 23 within the inner chamber 28 in fixed relationship thereto so as to maintain the seal means 22 in its proper position is effected by a mechanical interconnection mechanism. This interconnection mechanism comprises a pair of locking lugs 48 integrally formed with the cylindrical ring 40 and a pair of cooperative sockets 49 formed in the wall of the tubular housing 20. Each of the locking lugs 48 is formed with a rectangular cross-section and dimensioned to closely interfit in a similarly dimensioned, respective rectangular cross-sectioned socket 49. The lugs 48 are of a radial extent such that they project into the respective sockets 49, but will not extend outwardly of the exterior surface of the tubular housing 20. One side of each locking lug 48 is provided with a beveled surface 50 which is designed to facilitate insertion of the seal retainer 23 into the inner chamber 28 by a camming action as will be further described. The locking lugs 48 are positioned on the cylindrical ring 40 to place an end surface 51 of each locking lug 48 in substantial alignment with the end wall 47 of the seal retainer 23. Each end surface 51 is adapted to engage with a mating surface 52 of a respective socket 49. Thus, through appropriate axial dimensioning of the cylindrical ring 40, the seal retainer 23 will be effective to exert a compressive force against the fluid seal means 22.

Insertion of the seal retainer 23 into the inner chamber 28 as indicated is facilitated by the beveled surface 50 formed on the respective locking lug 48. As the seal retainer 23 is pushed axially inwardly through the outer cylindrical chamber 29, the outer surfaces of the locking lugs 48 will engage with the inner surface 53 of the frusto conical section 30. As the seal retainer 23 is pushed further inwardly, the beveled surfaces 50 engage with that inclined inner surface 53, thereby resulting in inward displacement, or camming, of that portion of the cylindrical ring 40 intermediate the respective axial slots 46. Diametrically opposed, axially extending grooves 54 are formed in the inner surface 53 of the frusto conical section 30 adjacent the small diameter cylindrical chamber 28. The grooves 54 are of the same width as the sockets 49 and are aligned therewith, thus permitting the locking lugs 48 to slide from the large diameter portion of the conical surface 53 and into the grooves 54 until the locking lugs 48 ultimately align with the sockets 49 and then spring outwardly into locking engagement therewith. The grooves 54 function not only to minimize the inward deflection required of the cylindrical ring 40, but to aid in guiding the locking lugs 48 into the respective sockets 49.

Carried by the seal retainer 23 are elements of the interlock indicating means 24. The elements are thus carried include two diametrically opposed axially extending arms 55 which in turn carry respective indicator tabs 56. Each of the arms 55 is integrally formed on the cylindrical ring 40 of the seal retainer 23 and projects axially from the end wall 47. The arms 55 are also of the same width as the locking lugs 48 and are positioned in axial alignment with the locking lugs 48. Each of the indicator tabs 56 is integrally formed with and carried at the outer extremity of the respective arm 55 and projects radially outwardly with respect thereto. The juncture of the arms 55 with the cylindrical ring 40 is reduced in thickness to provide an integral type hinge 57 to enhance the flexing ability of the arms 55. For purposes that will become apparent, each of the arms 55 is integrally molded with the seal retainer 23 so as to incline slightly radially inwardly. Each arm 55 has a composite inwardly facing surface that includes an inwardly inclined surface 58 terminating in an outwardly inclined surface portion 59. Each of the indicator tabs 56 is rectangular in cross-section and has radially extending walls 60 and 61 interconnected by an outer wall 62.

Formed in the walls of the tubular housing 20 at the juncture of the larger diameter cylindrical chamber 29 with the frusto conical section 30 are a pair of diametrically opposed apertures 53. The apertures 63 are axially aligned with the sockets 49 and are of a rectangular shape dimensioned to permit a respective indicator tab 56 to project therein and to move in a radial direction with respect thereto. In FIG. 1, the arms 55 of the interlock indicating means 24 are shown in an unflexed configuration. The arms 55 and the indicator tabs 56 are dimensioned such that the diametrical spacing of the outer wall 62 of the indicator tabs 56 results in the indicator tabs 56 being fully contained within the respective apertures 63 with that outer wall 62 being spaced a distance slightly inwardly of the exterior surface 64 of the tubular housing 20 when the interlock indicating means 24 is in the unflexed configuration.

Figure 3:
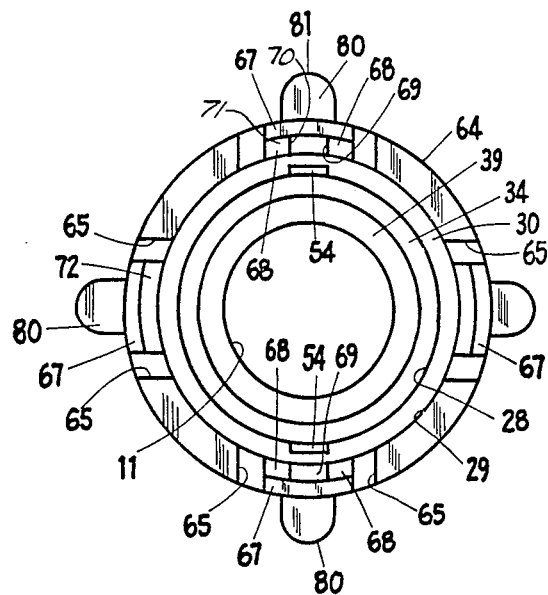
FIG. 3 is an end elevational view of the tubular housing as viewed on a plane designated by the line 3—3 of FIG. 1.

The portion of the tubular housing 20 forming the outer or larger diameter cylindrical chamber 29 has eight axially extending slots 65 formed in the cylindrical wall and opening at an end wall 66 of the tubular housing 20. The eight slots 65 extend axially inwardly to a point slightly greater than the midpoint of the outer chamber 29 and are relatively disposed in pairs to form four latching elements 67 that function to mechanically interconnect with the retainer cap 21 as will be further explained. Each of the latching elements 67 has portions thereof of a relatively reduced thickness as compared to the wall thickness of the tubular housing 20 associated with the outer chamber 29, as can be best seen in FIG. 3, with the chamber wall elements intermediate each pair of latching elements 67 being of the same thickness as the remaining portion of the chamber wall for maintaining its structural rigidity. Each of the latching elements 67 is of a relatively reduced thickness to enable those elements to be flexed relatively inwardly a sufficient distance to enable assembly of the tubular housing 20 with the retainer cap 21. Two of the latching elements 67 that are aligned with the apertures 63 are formed with pairs of axially extending rib elements 68 which are spaced apart to define therebetween a longitudinally extending groove 69. The opposed walls 70 of the rib elements 68 are spaced apart substantially the width of the respective aperture 63 to permit passage of the respective indicator tab 56 therethrough in traveling to the aperture 63. The rib elements 68 extend forwardly toward the open end of the tubular housing 20 terminating in a beveled surface 71 which is aligned with a similar beveled surface 72 at the transition point of each of the other two latch elements 67 with the wall of the tubular housing 20.

While the illustrative embodiment of the tubular housing 20 has each of the latching elements 67 defined by pairs of slots 65 formed in the marginal end portion of the tubular housing 20, the slots 65 in appropriately dimensioned structures may be omitted to obtain the necessary rigidity for maintaining assembled interconnection of components. Depending upon the wall thickness and the rigidity required, it may be sufficient to reduce the wall thickness to enable the wall to flex inwardly similar to the slot-formed latching elements.

With respect to the relative dimensioning of the seal retainer 23 and components of the interlock indicating means 24, it has been found advantageous to construct those components such that the diametrical dimension with respect to the outer wall 62 of the indicator tabs 56 is slightly greater than the internal diameter of the latching elements 67. With this dimensioning, assembly of the components requires that the interlock indicating means 24 be flexed slightly inwardly by applying diametrically opposed compressive forces to the respective indicator tabs 56 to the extent that these tabs will be enabled to slide into the interior of the outer chamber 29. Assembly of the components is facilitated to a substantial extent by the fact that the assembler can readily orient the seal retainer 23 with its other component and guide the indicator tabs 56 into the outer chamber 29 and between the rib elements 68. This greatly facilitates assembly, as it negates having to otherwise effect alignment of the locking lugs 48 with the grooves 54 in the frusto conical section 30 in order that the seal retainer 23 may be displaced axially inwardly of the tubular housing 20 to result in mechanical interengagement of the locking lugs 48 in the respective sockets 49 and positioning of the indicator tabs 56 in their respective apertures 63.

Mechanically secured engagement of the first fluid conduit 10 with the tubular housing 20 to effect a continuous fluid flow path as between the first and second fluid conduits 10 and 11 is the function of the retainer cap 21. To accomplish this objective, the retainer cap 21 is designed to incorporate a structural configuration that will cooperatively interengage with that of the tubular housing 20 and to also mechanically couple with components of the first fluid conduit 10, the annular ring 14 thereof. A second and particularly important objective of the retainer cap 21 is to effect operation of the interlock indicating means 24. To achieve these objectives, the retainer cap 21 is constructed to first mechanically intercouple with the tubular housing 20 in interlocked engagement and, when thus assembled with and mechanically interlocked with the tubular housing 20, to permit insertion of the terminal end portion 13 of the first fluid conduit 10 into assembled relationship with the tubular housing 20 by the simple expedient of axial insertion of the terminal end portion 13 through the retainer cap 21 and into the interior of the chambers 28 and 29 of the housing where the annular ring 14 will operate the interlock indicating means 24.

Figure 7:
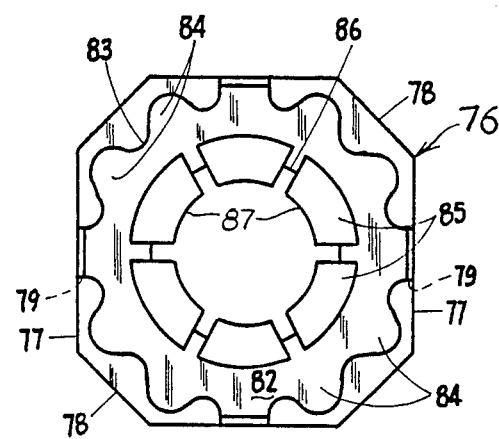
FIG. 7 is an end elevational view of the retainer cap as viewed on a plane designated by the line 7—7 of FIG. 1.
Figure 4:
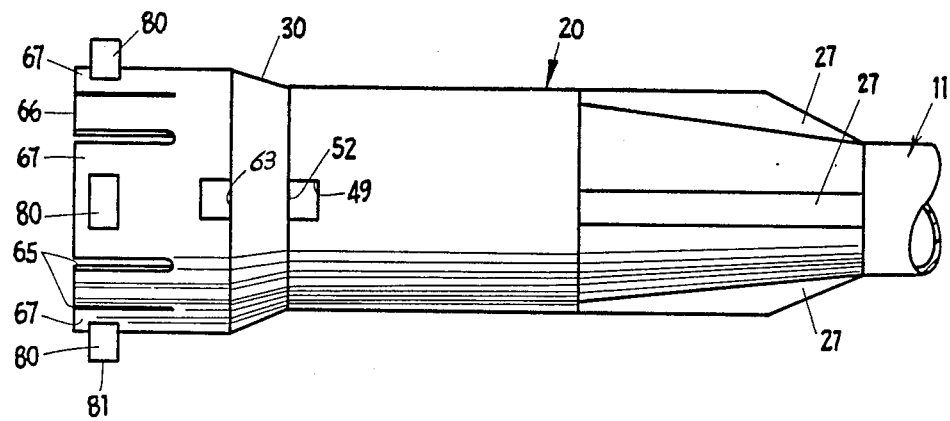
FIG. 4 is a top plan view of the tubular housing as viewed on a plane designated by the line 4—4 of FIG. 1.
Figure 8:
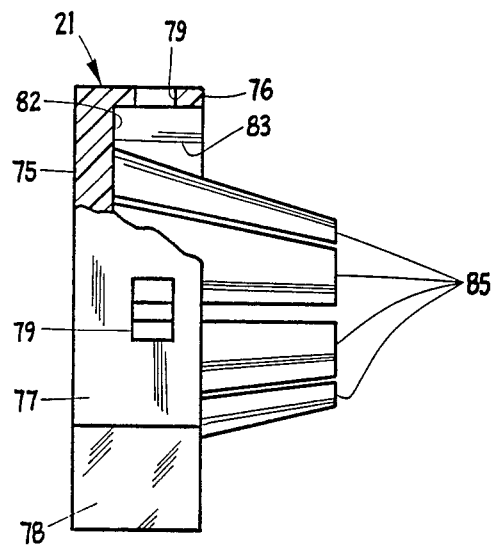
FIG. 8 is a side elevational view of the retainer cap as seen in FIG. 7 with a portion thereof broken away for clarity of illustration.
Figure 6:
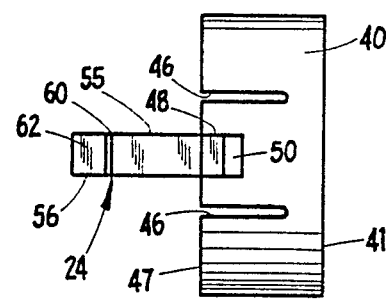
FIG. 6 is a top plan view of the seal retainer as seen in FIG. 5.

Structure of the specific illustrative embodiment of the retainer cap 21 can be ascertained from FIGS. 1, 7 and 8 as well as from FIG. 2 which shows the components in assembled relationship. The basic structure of the retainer cap 21 includes a radial end wall 75 which carries an integrally formed peripheral wall or skirt 76. The peripheral wall 76 is of a nonuniform octagonal shape with four sections 77 of the peripheral wall 76 having a straight exterior configuration that is substantially greater than that of the other four sections 78 which are alternatingly disposed between the larger sections 77. Centrally formed in each of the relatively larger sections 77 is a rectangularly shaped aperture 79. Each of the rectangular apertures 79 is of a configuration to cooperatively receive a respective one of coupling projections 80 that are integrally formed on each respective latching element 67 of the tubular housing 20. Each of the apertures 79 is of a rectangular cross-sectional shape and of a dimension to closely conform to the similar rectangular shape of the coupling projections 80. Each of the coupling projections 80 (as can be best seen in FIGS. 1 and 3) projects radially outwardly from the tubular housing 20 and is formed with an arcuately curved outer end extremity 81 having a predetermined radius of curvature. The rectangular apertures 79 are formed in the peripheral wall or skirt 76 at a particular location with respect to the interiorly facing surface 82 of the radial end wall 75. This is not of particular significance other than to provide adequate clearance for assembly of the retainer cap 21 with the tubular housing 20. It is not essential with this structure that the surface 82 be caused to mechanically interengage with the end wall 66 of the housing 20. It is only essential that the retainer cap 21 be mechanically secured on the end of the tubular housing 20 by means of the coupling projections 80.

It is advantageous that the assembly of the retainer cap 21 with the tubular housing 20 as well as its disassembly be effected by a mechanical motion that is operationally equivalent to the motion for effecting coupling or disassembly of a threaded type of coupling. More specifically, the construction of the retainer cap 21 is such that its assembly with the tubular housing 20 or disassembly therefrom involves a rotary motion about a longitudinal axis. The exterior flat sided surfaces of the sections 77 and 78 strongly resemble those of the conventional hexagonal cap nut for such assemblies and clearly suggest to the mechanical that there is a rotary motion required for effecting either the assembly or disassembly. It has been found that equating of the particular mechanical motion is of substantial importance in that a mechanic knowledgeable in the prior art structures will not be confused as to the particular technology and will be able to readily adapt and perform the necessary operations to either interconnect or disconnect the components through employment of the expected relative rotation of the components such as the retainer cap 21 with respect to the tubular housing 20.

Interconnection of the tubular housing 20 with the retainer cap 21 is facilitated by formation of a serpentine or convoluted surface 83 on the inwardly facing side of the peripheral wall 76. This surface as can be best seen in FIG. 7 includes a plurality of inwardly facing arcuately curved sockets 84 that are of a configuration to cooperatively receive the coupling projections 80 when the retainer cap is pushed axially onto the end of the tubular housing 20. The arcuately curved sockets 84 are formed with their centers on a common diameter being arranged in pairs between respective rectangular apertures 79. Since the sections 77 and 78 forming the peripheral wall 76 are of different lengths, they are disposed at different radial distances, with the larger or longer sections 77 being disposed a slight distance relatively inward. This disposition of the sections 77 effectively results in cutting off of an area that would otherwise comprise one of the curved sockets 84 for receiving the respective coupling projection 80. Consequently, when the retainer cap 21 is positioned on the end of the housing 20 with the projections 80 disposed in respective ones of the sockets 84 and the retainer cap 21 is then revolved in one direction or the other, the convoluted interior wall surface 83 will perform a camming function and cause the coupling projections 80 to initially move radially inwardly along with the latching elements 67 on which they are formed. When the retainer cap 21 has been rotated a sufficient angular distance so that the coupling projections 80 will have moved into the space which contains a rectangular aperture 79, those projections will then spring radially outward into the apertures, resulting in the outermost portions projecting exteriorly of the outer surface of the peripheral wall 76. Thus, the base portion of the coupling projections 80 perform the mechanical coupling function to maintain the retainer cap 21 on the tubular housing 20. The outermost portions of the coupling projections 80 perform the function of visually, or by tactile perception, indicating that the cap and housing are securely mechanically interlocked. Removal of the retainer cap 21 from the tubular housing 20 is effected in a reverse manner, with the convoluted interior wall surface 83 again performing a camming function to urge the coupling projections 80 radially inwardly against the biasing force of the respective latching elements 67. After the retainer is relatively rotated to a position where the coupling projections 80 are fully withdrawn from the respective apertures 79, the retainer cap 21 may be pulled in an axial direction off from the end of the housing tubular 20. Uncoupling may be facilitated by manually pushing the coupling projections 80 inwardly in order that the curved extremities 81 will be in contact with the convoluted interior wall surface 83 when the retainer cap 21 is rotated.

To enable the retainer cap 21 to perform its intended function of retaining the first fluid conduit 10 in assembled relationship with the quick connector, thereby forming a continuous fluid path with respect to the second fluid conduit 11, the retainer cap 21 is provided with a plurality of resilient retaining fingers 85. There are six of these fingers 85 in the illustrative embodiment, and they are of a geometrical configuration to cooperatively define a frusto conical shape. Each of the fingers 85 is integrally formed at its base with the radial end wall 75 around a circular aperture 86 that is of a diameter sufficiently large to permit passage of the first fluid conduit 10 therethrough (and, in particular, the annular ring 14 on the first fluid conduit 10). Each of the retaining fingers 85 thus extends in an axially inward direction when the retainer cap 21 is assembled with the tubular housing 20, and they project into the interior of the outer chamber 29. The retaining fingers 85 converge radially inwardly terminating in axially extending surfaces 87 disposed on a diameter that is substantially equivalent to the diameter of the exterior surface of the first fluid conduit 10. The retaining fingers 85 have an effective axial length such that, when the retainer cap 21 is assembled with the tubular housing 20, they will engage with the outwardly facing wall surface 16 of the annular ring 14 when the terminal end portion 13 of the first fluid conduit 10 is pushed axially inwardly into the interior of the tubular housing 20.

The assembly of the first fluid conduit 10 and tubular housing 20 is easily accomplished by merely pushing the terminal end portion 13 of the first fluid conduit 10 through the circular aperture 86 and forcing the annular ring 14 between the retaining fingers 85, causing them to expand and to ride up over the cylindrical band 17. When the annular ring 14 passes from between the axial surfaces 87 of the retaining fingers 85, the retaining fingers 85 will then spring inwardly toward the first fluid conduit 10 and, depending upon the relative dimensions, may come into contacting engagement with the first fluid conduit 10. With the retaining fingers 85 thus positioned around the first fluid conduit 10, the terminal ends of the retaining fingers 85 will engage with the surface 16 of the annular ring 14 and thereby resist removal of the first fluid conduit 10 from the tubular housing 20.

Also as can be best seen in FIG. 2 where the components are shown fully assembled, the axial lengths of the several elements is such that the terminal end portion 13 of the first fluid conduit 10 extend through the seal means 22 and project slightly into the small chamber 36. When thus assembled, the terminal end portion 13 not only forms a sealing contact with the cylindrical surfaces 32, but causes the seal to be compressed tightly against the cylindrical walls of the inner chamber 28 and to thereby form a fluid seal between those contacting surfaces. When thus assembled, the seal retainer 23 is also seen to function in supporting and maintaining the first fluid conduit 10 in a fixed central position. This mechanical supporting of the first fluid conduit 10 aids in obtaining an effective fluid seal, as it prevents unequal distortion of the seal which could otherwise readily result through lateral twisting of the first fluid conduit 10 with respect to the tubular housing 20.

Assembly of the first fluid conduit 10 with the tubular housing 20 as shown in FIG. 2 also results in concurrent actuation of the interlock indicating means 24 to provide a perceivable indication that the first fluid conduit 10 is properly interlocked in mechanical engagement with the tubular housing 20. As the first fluid conduit 10 is pushed axially into the interior of the tubular housing 20, the annular ring 14 as it exits from between the surfaces 87 of the retaining fingers 85 will cause the inwardly facing surface 15 of the annular ring 14 to come into contacting engagement with the inclined surface portion 59 of the two axially extending arms 55 carried by the seal retainer 23. Continued inward axial displacement of the first fluid conduit 10 will eventually cause in the composite surfaces 15 and 17 of the annular ring 14 to engage with the inwardly inclined surfaces 58 of the axially extending arms 55. This operation of the annular ring 14 results in outward flexing of the axially extending arms 55 thereby causing the indicator tabs 56 to project radially outwardly through the respective apertures 63 to a position where they may be visually perceived. Also, the extension of a portion of the indicator tabs 56 to a position physically outside of the tubular housing 20 will enable one to determine that the interlocking has been effected by merely feeling the exterior of the tubular housing 20 in those situations where the connector assembly either cannot be readily seen or may be in a dark location such that one cannot readily see the indicator tabs 56. It will be noted that providing of the annular ring 14 results in an assembly wherein the first fluid conduit 10 may swivel about the longitudinal axis when inserted in the connector fitting 12 and continue to function in actuation of the indicator tabs 56. Use of a structure other than a continuous ring could be functionally equivalent in performance of the indicator tab actuation, but it would then be necessary to maintain the ring equivalent structure in engagement with the interlock indicating means 24.

From the foregoing description of an illustrative embodiment of the invention, it will be readily apparent that a novel quick connector assembly is provided that effectively fulfills the essential mechanical function of forming a fluid tight interconnection between conduit elements, but also enables the interconnection to be quickly made to achieve the cost savings dictated by automobile production management. An important aspect of this invention is providing of a structure that enables the assembler of conduits using this connector assembly to assure that a positive mechanical interlock of the components has been obtained through providing of indicator tabs which permit visual and tactile perception of the interlocked condition. The further structural feature of the quick connector assembly of this invention which permits disassembly by relative manipulation of the components in a manner similar to that associated with customary screw-threaded components greatly enhances the serviceability of systems utilizing this connector assembly.

Having thus described this invention, what is claimed is:

1. A connector assembly for tubular conduit means comprising:
   (A) a first tubular conduit having a terminal connector end portion and an annular ring disposed on said end portion in fixed relationship at a predetermined distance from the end thereof, said annular ring projecting a distance radially outwardly from the conduit, and
   (B) a connector fitting adapted for interconnection with a second conduit and with said first conduit, whereby fluid may flow through said conduits when interconnected, said connector fitting including:
   (1) an elongated tubular housing connectable in fluid flow relationship with said second conduit for receiving the connector end portion of said first tubular conduit therein in axially extending relationship through an open end of said housing;
   (2) fluid seal means positioned in said tubular housing in retained relationship for providing a seal between said connector fitting and said first conduit;
   (3) a retainer cap adapted to be mechanically interconnected with said tubular housing at an end thereof through which said first conduit is inserted by resilient retaining means projecting axially inwardly of said housing for locking engagement with said annular ring to prevent withdrawal of said first conduit when operatively inserted into said tubular housing; and
   (4) interlock indicating means responsive to positioning of said first conduit in said housing in locked engagement with said retainer cap through mechanical interengagement of said interlock indicating means with the annular ring on said first conduit for providing a perceivable indication of such locked engagement, said interlock indicating means including an indicator tab carrier by support means for displacement between a position where it is fully contained within said housing and a position where at least a portion of said tab is disposed exteriorly of said housing, said indicator tab being radially displaceable with respect to said housing, and said housing having an aperture formed in the wall thereof through which said indicator tab is projectable.

2. A connector assembly according to claim 1 which includes resilient biasing means operatively coupled with said indicator tab for urging of said indicator tab in a radially inward direction.

3. A connector assembly according to claim 1 wherein said support means for said indicator tab includes an elongated arm pivotably secured at one end in supported relationship within said housing for swinging movement about said one end in a direction that is radially oriented with respect to said housing, said indicator tab carried on said elongated arm in remote relationship to said one end thereof.

4. A connector assembly according to claim 1 wherein said support means includes a retainer ring positioned in said elongated tubular housing in fixedly retained relationship thereto, resilient fluid seal means disposed within said tubular housing in relatively inward relationship to said retainer ring and formed with an axially extending base for receiving in fluid sealing relationship the terminal end portion of said first conduit projected through the bore, said retainer ring contactingly engageable with said seal means for retaining said seal means in said housing.

5. A connector assembly according to claim 4 wherein said retainer ring is formed with an axially extending bore through which the terminal end portion of said first conduit is projected, said retainer ring bore being formed with support guide means cooperatively engageable with said first conduit.

6. A connector assembly for tubular conduit means comprising:

(A) a first tubular conduit having a terminal connector end portion and an annular ring disposed on said end portion in fixed relationship at a predetermined distance from the end thereof, said annular ring projecting a distance radially outwardly from the conduit, and (B) a connector fitting adapted for interconnection with a second conduit and with said first conduit, whereby fluid may flow through said conduits when interconnected, said connector fitting including:

(1) an elongated tubular housing connectable in fluid flow relationship with said second conduit for receiving the connector end portion of said first tubular conduit therein in axially extending relationship through an open end of said housing;

(2) fluid seal means positioned in said tubular housing in retained relationship for providing a seal between said connector fitting and said first conduit;

(3) a retainer cap adapted to be mechanically interconnected with said tubular housing at an end thereof through which said first conduit is inserted by resilient retaining means projecting axially inwardly of said housing for locking engagement with said annular ring to prevent withdrawal of said first conduit when operatively inserted into said tubular housing; and (4) interlock indicating means responsive to positioning of said first conduit in said housing in locked engagement with said retainer cap through mechanical interengagement of said interlock indicating means with the annular ring on said first conduit for providing a perceivable indication of such locked engagement, said interlock indicating means including an indicator tab carried by support means for displacement between a position where it is fully contained within said housing and a position where at least a portion of said tab is disposed exteriorly of said housing, said support means for said indicator tab including an elongated arm pivotably secured at one end in supported relationship within said housing for swinging movement about said one end in a direction that is radially oriented with respect to said housing, said indicator tab being carried on said elongated arm in remote relationship to said one end thereof, and said tubular housing being formed with an aperture through which said indicator tab is adapted to be displaced.

7. A connector assembly for tubular conduit means comprising:

(A) a first tubular conduit having a terminal connector end portion and an annular ring disposed on said end portion in fixed relationship at a predetermined distance from the end thereof, said annular ring projecting a distance radially outwardly from the conduit, and (B) a connector fitting adapted for interconnection with a second conduit and with said first conduit, whereby fluid may flow through said conduits when interconnected, said connector fitting including:

(1) an elongated tubular housing connectable in fluid flow relationship with said second conduit for receiving the connector end portion of said first tubular conduit therein in axially extending relationship through an open end of said housing;

(2) fluid seal means positioned in said tubular housing in retained relationship for providing a seal between said connector fitting and said first conduit;

(3) a retainer cap adapted to be mechanically interconnected with said tubular housing at an end thereof through which said first conduit is inserted by resilient retaining means projecting axially inwardly of said housing for locking engagement with said annular ring to prevent withdrawal of said first conduit when operatively inserted into said tubular housing; and (4) interlock indicating means responsive to positioning of said first conduit in said housing in locked engagement with said retainer cap through mechanical interengagement of said interlock indicating means with the annular ring on said first conduit for providing a perceivable indication of such locked engagement, said interlock indicating means including an indicator tab carried by support means for displacement between a position where it is fully contained within said housing and a position where at least a portion of said tab is disposed exteriorly of said housing, said support means for said indicator tab including an elongated arm pivotably secured at one end in supported relationship within said housing for swinging movement about said one end in a direction that is radially oriented with respect to said housing, said indicator tab being carried on said elongated arm in remote relationship to said one end thereof, and said elongated arm being disposed in axially extending relationship to said housing in a position to contactingly engage said annular ring which said first conduit is operatively inserted into said tubular housing, whereby said arm is flexed radially outwardly and projects at least a portion of said indicator tab exteriorally of said housing.

8. A connector assembly for tubular conduit means comprising:
(A) a first tubular conduit having a terminal connector end portion and an annular ring disposed on said end portion in fixed relationship at a predetermined distance from the end thereof, said annular ring projecting a distance radially outwardly from the conduit, and
(B) a connector fitting adapted for interconnection with a second conduit and with said first conduit, whereby fluid may flow through said conduits when interconnected, said connector fitting including:
(1) an elongated tubular housing connectable in fluid flow relationship with said second conduit for receiving the connector end portion of said first tubular conduit therein in axially extending relationship through an open end of said housing;
(2) fluid seal means positioned in said tubular housing in retained relationship for providing a seal between said connector fitting and said first conduit;
(3) a retainer cap adapted to be mechanically interconnected with said tubular housing at an end thereof through which said first conduit is inserted by resilient retaining means projecting axially inwardly of said housing for locking engagement with said annular ring to prevent withdrawal of said first conduit when operatively inserted into said tubular housing; and
(4) interlock indicating means responsive to positioning of said first conduit in said housing in locked engagement with said retainer cap through mechanical interengagement of said interlock indicating means with the annular ring on said first conduit for providing a perceivable indication of such locked engagement, said interlock indicating means including an indicator tab carried by support means for displacement between a position where it is fully contained within said housing and a position where at least a portion of said tab is disposed exteriorly of said housing, said support means for said indicator tab including an elongated arm pivotably secured at one end in supported relationship within said housing for swinging about said one end in a direction that is radially oriented with respect to said housing, said indicator tab being carried on said elongated arm in remote relationship to said one end thereof, and said elongated arm being resiliently biased in a radially inward direction.

9. A connector assembly according to claim 8 wherein said indicator tab support means includes a retainer ring positionable in said elongated tubular housing in fixedly retained relationship thereto, said elongated arm being pivotably secured at its said one end to said retainer ring.

10. A connector assembly according to claim 9 wherein said elongated arm is disposed in axially extending relationship to said housing and is pivoted on said retainer ring for swinging movement about an axis disposed transversely to the longitudinal axis of said housing.

11. A connector assembly for tubular conduit means comprising:
(A) a first tubular conduit having a terminal connector end portion and an annular ring disposed on said end portion in fixed relationship at a predetermined distance from the end thereof, said annular ring projecting a distance radially outwardly from the conduit, and
(B) a connector fitting adapted for interconnection with a second conduit and with said first conduit, whereby fluid may flow through said conduits when interconnected, said connector fitting including:
(1) an elongated tubular housing connectable in fluid flow relationship with said second conduit for receiving the connector end portion of said first tubular conduit therein in axially extending relationship through an open end of said housing;
(2) fluid seal means positioned in said tubular housing in retained relationship for providing a seal between said connector fitting and said first conduit;
(3) a retainer cap adapted to be mechanically interconnected with said tubular housing at an end thereof through which said first conduit is inserted by resilient retaining means projecting axially inwardly of said housing for locking engagement with said annular ring to prevent withdrawal of said first conduit when operatively inserted into said tubular housing; and
(4) interlock indicating means responsive to positioning of said first conduit in said housing in locked engagement with said retainer cap through mechanical interengagement of said interlock indicating means with the annular ring on said first conduit for providing a perceivable indication of such locked engagement, said retainer cap resilient retaining means including a plurality of axially extending fingers secured at one end thereof in a circular configuration and projecting a distance inwardly of said housing, the inner end portions of said fingers defining a circular abutment having a diameter less than the diameter of said annular ring for mechanically engaging therewith to prevent withdrawal of said first conduit therethrough.

12. A connector assembly according to claim 11 wherein said axially extending fingers are adapted to be flexed in a radially outward direction to permit passage of said first conduit and annular ring therethrough.

13. A connector assembly according to claim 12 wherein said retainer cap includes an end wall on which said axially extending fingers are carried, said end wall having an aperture through which said first conduit and annular ring are projectable.

14. A connector assembly according to claim 13 wherein said axially extending fingers are of a length to maintain said annular ring at a position in contacting engagement with said interlock indicating means.

15. A quick connection connector assembly for tubular conduit means comprising:
  (A) A first tubular conduit having a terminal connector end portion and an annular ring disposed on said end portion in fixed relationship at a predetermined distance from the end thereof, said annular ring projecting a distance radially outward from the conduit, and
  (B) a connector fitting adapted for interconnection with a second conduit and with said first conduit whereby fluid may flow through said conduits when interconnected, said connector fitting including:
    (1) an elongated tubular housing connectable in fluid flow relationship with said second conduit and open at one end for receiving the connector end portion of said first tubular conduit therein through said open end in axially extending relationship, said tubular housing having a plurality of projections formed on the exterior thereof in angularly disposed relationship closely adjacent said open end and extending a distance radially outward,
    (2) fluid seal means positioned in said tubular housing in retained relationship for providing a seal between said connector fitting and said first conduit, and
    (3) a retainer cap adapted to be mechanically interconnected with said tubular housing at an end thereof through which said first conduit is inserted and having resilient retaining means projecting axially inward of said housing for locking engagement with said annular ring to prevent withdrawal of said first conduit when operatively inserted into said tubular housing, said retainer cap having a recess formed therein for receiving a marginal end portion of said tubular housing and the projections formed thereon and to cooperatively mechanically couple with said projections for maintaining said cap and housing in interconnected relationship and to provide perceivable indication of such interconnected relationship.

16. A connector assembly according to claim 15 wherein said retainer cap includes a peripheral wall having sockets formed therein for receiving respective ones of said projections.

17. A connector assembly according to claim 16 wherein said peripheral wall is formed with a camming surface facing radially inward with respect to a longitudinal axis of the connector assembly, said camming surface cooperatively engageable with said projections to effect radially inward displacement of said projection upon rotation of said cap about the longitudinal axis for enabling said projections to be aligned with respective ones of said sockets and into which they will extend.

18. A connector assembly for a tubular conduit means comprising:
  (A) a first tubular conduit having a terminal connector end portion and an annular ring disposed on said portion in fixed relationship at a predetermined distance from the end thereof, said annular ring projecting a distance radially outwardly from the conduit, and
  (B) a connector fitting adaptor for interconnection with a second conduit and with said first conduit, whereby fluid may flow through said conduits when interconnected, said connector fitting including:
    (1) an elongated tubular housing connectable in fluid flow relationship with said second conduit and open at one end for receiving the connector end portion of said first tubular conduit therein in axially extending relationship;
    (2) fluid seal means positioned in said tubular housing in retained relationship for providing a seal between said connector fitting and said first conduit; and
    (3) a retainer cap adapted to be mechanically interconnected with said tubular housing at an end thereof through which said first conduit is inserted and having resilient retaining means projecting axially inwardly of said housing for locking engagement with said annular ring to prevent withdrawal of said first conduit when operatively inserted into said tubular housing, said retainer cap and said tubular housing being provided with cooperative assembly indicator means operable upon interconnection of said cap and said housing for indicating interconnection therebetween, said retainer cap including a peripheral wall adapted to overlie a marginal end portion of said elongated tubular housing at the open end thereof, said cooperative assembly indicator means including at least one projection formed on said elongated tubular housing and extending radially outwardly with respect to the exterior thereof and an aperture formed in the peripheral wall of said retainer cap through which at least a portion of said projection is projectable to the exterior thereof for providing a perceivable indication of interconnection of said retainer cap and said tubular housing.

19. A connector assembly according to claim 18 wherein said elongated tubular housing is formed with a resiliently biased latching element carrying said projection, said latching element adapted to be flexed radially inward to permit assembly or disassembly of said cap and housing, said latching element and projection mechanically locking said cap and housing in interconnected relationship.

20. A quick connection connector assembly for tubular conduit means comprising:
  (A) a first tubular conduit having a terminal connector end portion and an annular ring disposed on said end portion in fixed relationship at a predetermined distance from the end thereof, said annular ring projecting a distance radially outward from the conduit, and
  (B) a connector fitting adapted for interconnection with a second conduit and with said first conduit whereby fluid may flow through said conduits when interconnected, said connector fitting including:
    (1) an elongated tubular housing connectable in fluid flow relationship with said second conduit for receiving the connector end portion of said first tubular conduit therein in axially extending relationship through an open end of said housing, (2) fluid seal means positioned in said tubular housing in retained relationship for providing a seal between said connector fitting and said first conduit, (3) a retainer cap adapted to be mechanically interconnected with said tubular housing at an end thereof through which said first conduit is inserted and resilient retaining means projecting axially inward of said housing for locking engagement with said annular ring to prevent withdrawal of said first conduit when operatively inserted into said tubular housing, and (4) interlock indicating means responsive to positioning of said first conduit in said housing in locked engagement with said retainer cap through mechanical interengagement of said interlock indicating means with the annular ring on said first conduit for providing a perceivable indication of such locked engagement, said interlock indicating means including:

(a) a retainer ring positionable in said elongated tubular housing in fixedly retained relationship thereto, (b) an elongated arm disposed in axially extending relationship to said housing and pivotably secured at one end in supported relationship on said retainer ring and within said housing for swinging movement about said one end in a direction that is radially oriented with respect to said housing, said elongated arm being resiliently biased in a radially inward direction and including a camming surface facing radially inward of said housing for contacting engagement with said annular ring when said first conduit is operatively inserted into said housing, said elongated arm being normally radially disposed with respect to said housing with its camming surface projected into the path of movement of said annular ring whereby said annular ring will pivot said elongated arm in a radially outward direction, and (c) an indicator tab carried on said elongated arm in remote relationship to said one end thereof for displacement between a position where it is fully contained within said housing and a position where at least a portion of said tab is disposed exteriorly of said housing when said elongated arm is cammed radially outward by said annular ring when said annular ring is in locked engagement with said retainer cap.

21. A connector assembly according to claim 20 wherein said elongated arm is pivoted on said retainer ring for swinging movement about an axis disposed transversely to the longitudinal axis of said housing.

22. A quick connection connector assembly for tubular conduit means comprising:

(A) a first tubular conduit having a terminal connector end portion and an annular ring disposed on said end portion in fixed relationship at a predetermined distance from the end thereof, said annular ring projecting a distance radially outward from the conduit, and (B) a connector fitting adapted for interconnection with a second conduit and with said first conduit whereby fluid may flow through said conduits when interconnected, said connector fitting including:

(1) an elongated tubular housing connectable in fluid flow relationship with said second conduit for receiving the connector end portion of said first tubular conduit therein in axially extending relationship through an open end of said housing, said housing having an aperture formed in the wall thereof, (2) fluid seal means positioned in said tubular housing in retained relationship for providing a seal between said connector fitting and said first conduit, (3) a retainer cap adapted to be mechanically interconnected with said tubular housing at an end thereof through which said first conduit is inserted and resilient retaining means projecting axially inward of said housing for locking engagement with said annular ring to prevent withdrawal of said first conduit when operatively inserted into said tubular housing, and (4) interlock indicating means responsive to positioning of said first conduit in said housing in locked engagement with said retainer cap through mechanical interengagement of said interlock indicating means with the annular ring on said first conduit for providing a perceivable indication of such locked engagement, said interlock indicating means including:

(a) a retainer ring positionable in said elongated tubular housing in fixedly retained relationship thereto, (b) an elongated arm pivotably secured at one end to said retainer ring by an integral hinge for swinging movement in a radially disposed plane extending parallel to the longitudinal axis of said housing with the free end of said arm extending toward the open end of said housing, said elongated arm adapted to be contactingly engaged by said annular ring and to be thereby swung radially outward, (c) an indicator tab carried on said elongated arm in remote relationship to said one end thereof pivotably secured to said retainer ring and at a position where said tab can be radially displaced with respect to said housing projected into said housing aperture, said elongated arm being displaceable between a position where said tab is fully contained within said housing and a position where at least a portion of said tab is disposed exteriorly of said housing when said annular ring is in locked engagement with said retainer cap retaining means, and (d) resilient biasing means operatively coupled with said indicator tab for urging of said indicator tab in a radially inward direction.

23. A quick connection connector assembly for tubular conduit means, said assembly comprising:

(a) a first fluid conduit (10) having:

(i) a first bore for the passage of fluid, said first bore having an open extreme end (18) at the distal end of said first fluid conduit (10);

(ii) an annular ring (14) on the external periphery of said first conduit (10); and (iii) a terminal end portion (13) projecting beyond said annular ring (14) and ending in said open extreme end (18);

(b) a second fluid conduit (11) having:

(i) a second bore for the passage of fluid, said second bore having an open extreme end at the distal end of said second fluid conduit (11), said second bore comprising, starting from the open extreme end, an outer cylindrical chamber (29), a frusto conical section (30) of decreasing diameter, an inner cylindrical chamber (28), and a cylindrical chamber (39) the diameter of which is less than the diameter said inner cylindrical chamber (28);
  (ii) a plurality of sockets (49) extending radially outwardly from said inner cylindrical chamber (28); and
  (iii) a plurality of coupling projections (80) extending radially outwardly from the exterior periphery of said second fluid conduit (11) near its distal end;
(c) a fluid seal means (22) having:
  (i) an outer surface sized and shaped to be received in said inner cylindrical chamber (28) in fluid tight engagement with said second fluid conduit (11) and
  (ii) an inner surface sized and shaped to receive said terminal end portion (13) of said first fluid conduit (10) in fluid tight engagement;
(d) a seal retainer (23) having:
  (i) a cylindrical ring (40) sized and shaped to be received in said inner cylinderical chamber (28), to bear against said fluid seal means (22), and to cause said fluid seal means (22) to bear against an inwardly projecting lip (34) defining the proximal end of said inner chamber (28);
  (ii) a plurality of locking lugs (48), each one of said plurality of locking lugs (48) being sized, shaped, and positioned to be received in a corresponding one of said plurality of sockets (49); and
  (iii) a plurality of inwardly projecting, axially extending lands (42), each one of said plurality of inwardly projecting, axially extending lands (42) extending the length of said cylindrical ring (40) and having a concave, inwardly facing surface (43) sized and shaped to receive said terminal end portion (13) of said first fluid conduit (10); and
(e) a retainer cap (21) comprising:
  (i) a radial end wall (75) having a circular aperture (86) therethrough sized and shaped to pass said first fluid conduit (10);
  (ii) a peripheral wall (76) projecting axially from said radial end wall (75);
  (iii) a plurality of radial apertures (79) formed in said peripheral wall (76), each one of said plurality of radial apertures (79) being sized, shaped, and positioned to receive a corresponding one of said plurality of coupling projections (80); and
  (iv) a plurality of inwardly projecting resilient retaining fingers (85) projecting axially from said radial end wall (75) radially inwardly of said peripheral wall (76), each one of said plurality of inwardly projecting resilient retaining fingers (85) being sized, shaped, and positioned to bear against said first fluid conduit (10) proximally of said annular ring (14).

24. A quick connection connector assembly as recited in claim 23 wherein the outer surface of said terminal end portion (13) of said first fluid conduit (10) is smooth.

25. A quick connection connector assembly as recited in claim 23 wherein said open extreme end (18) is radiused to facilitate the insertion of said first fluid conduit (10) into said fluid seal means (22).

26. A quick connection connector assembly as recited in claim 23 wherein said inner surface of said fluid seal means (22) comprises two axially spaced inwardly projecting annular rings (31) separated by an annular recess (33).

27. A quick connection connector assembly as recited in claim 23 wherein a beveled surface (35) is formed at the end of said fluid seal means (22) that receives said terminal end portion (13) of said first fluid conduit (10) to facilitate insertion of said terminal end portion (13) into said fluid seal means (22).

28. A quick connection connector assembly as recited in claim 23 wherein the axial length of said terminal end portion (13) of said first fluid conduit (10) is such that said open extreme end (18) projects into said cylindrical chamber (39) the diameter of which is less than the diameter of said inner cylindrical chamber (28).

29. A quick connection connector assembly as recited in claim 23 and further comprising a plurality of projections (44) projecting inwardly from the inner surface of said cylindrical ring (40), each one of said plurality of projections (44):
  (a) being disposed between two adjacent ones of said plurality of inwardly projecting, axially extending lands (42);
  (b) being of shorter axial length than said plurality of inwardly projecting, axially extending lands (42); and
  (c) having a concave, inwardly facing surface (45) sized and shaped to receive said terminal end portion (13) of said first fluid conduit (10).

30. A quick connection connector assembly as recited in claim 29 wherein the entrance end of each one of said plurality of projections is radiused to facilitate entry into said terminal end portion (13) of said first fluid conduit (10).

31. A quick connection connector assembly as recited in claim 23 wherein a plurality of axially extending slots (46) are formed in said cylindrical ring (40), each one of said plurality of axially extending slots (46) being open at the end of said cylindrical ring (40) into which said terminal end portion (13) of said first fluid conduit (10) is inserted, one of said plurality of axially extending slots (46) being formed on each side of and adjacent to a corresponding one of said plurality of projections (44).

32. A quick connection connector assembly as recited in claim 23 wherein a plurality of axially extending slots (46) are formed in said cylindrical ring (40), each one of said plurality of axially extending slots being open at the end of said cylindrical ring (40) into which said terminal end portion (13) of said first fluid conduit (10) is inserted.

33. A quick connection connector assembly as recited in claim 23 wherein the extreme end of each one of said plurality of inwardly projecting, axially extending lands (42) is radiused to facilitate entry of said terminal end portion (13) of said first fluid conduit (10).

34. A quick connection connector assembly as recited in claim 23 wherein each one of said plurality of locking lugs (48) has a rectangular cross section and is dimensioned to be closely received in a corresponding one of said plurality of sockets (49).

35. A quick connection connector assembly as recited in claim 23 wherein each one of said plurality of locking lugs (48) is radially dimensioned so that is does not extend outwardly of the outer surface of said second fluid conduit (11).

36. A quick connection connector assembly as recited in claim 23 wherein the extreme end of each one of said plurality of locking lugs (48) is beveled to facilitate insertion of said seal retainer (23) into said inner chamber (28).

37. A quick connection connector assembly as recited in claim 23 wherein the end of said cylindrical ring (40) into which said terminal end portion (13) of said first fluid conduit (10) is inserted is in at least substantial alignment with an axial end of each one of said plurality of locking lugs (48).

38. A quick connection connector assembly as recited in claim 23 wherein said plurality of locking lugs (48) are sized, shaped, and positioned to be cammed inwardly by said frusto conical section (30) during insertion of said first fluid conduit (10) into said second fluid conduit (11).

39. A quick connection connector assembly as recited in claim 23 wherein a plurality of axially extending grooves (54) are formed in the inner surface of said frusto conical section (30), each one of said plurality of axially extending grooves (54) being in alignment with a corresponding one of said plurality of sockets (49), each one of said plurality of axially extending grooves (54) being sized, shaped, and positioned to guide a corresponding one of said plurality of locking lugs (48) into a corresponding one of said plurality of sockets (49).

40. A quick connection connector assembly as recited in claim 23 wherein said second fluid conduit (11) has a plurality of axially extending slots (65) beginning at said open extreme end and defining therebetween a plurality of latching elements (67).

41. A quick connection connector assembly as recited in claim 40 wherein each one of said plurality of coupling projections (80) is formed on a corresponding one of said plurality of latching elements (67).

42. A quick connection connector assembly as recited in claim 23 wherein the radially outer surface of said peripheral wall (76) is polygonal.

43. A quick connection connector assembly as recited in claim 41 wherein:

(a) said radially outer surface of said peripheral wall (76) has an even number of sides;
(b) the circumferential length of every other one (77) of said sides is substantially greater than the circumferential length of the intervening one (78) of said sides; and
(c) each one of said plurality of radial apertures is centrally located in a corresponding one of said every other one (77) of said sides.

44. A quick connection connector assembly as recited in claim 23 wherein each one of said plurality of radial aperture (79) has a rectangular cross section and is dimensioned to closely receive a corresponding one of said plurality of coupling projections (80).

45. A quick connection connector assembly as recited in claim 23 wherein said peripheral wall (76) has a convoluted inner surface (83) including a plurality of inwardly facing arcuately curved sockets (84) sized, shaped, and positioned to receive said plurality of coupling projections (80) when said retainer cap (21) is pushed axially onto the distal end of said second fluid conduit (11).

46. A quick connection connector assembly as recited in claim 45 wherein:

(a) said plurality of inwardly facing arcuately curved sockets (84) are formed with their centers on a common diameter and
(b) said plurality of inwardly facing arcuately curved sockets (84) are arranged in pairs between adjacent ones of said plurality of radial apertures (79).

47. A quick connection connector assembly as recited in claim 45 wherein said plurality of inwardly facing arcuately curved sockets (84) are sized, shaped, and positioned to cam said plurality of coupling projections (80) inwardly as said retainer cap (21) is rotated around said fluid conduit (11).

48. A quick connection connector assembly as recited in claim 23 wherein said plurality of coupling projections are radially sized so that each one of said plurality of coupling projections (80) projects radially outwardly beyond said peripheral wall (76).

* * * * *